A. R. MORRILL.
MACHINE FOR PREPARING WELTING.
APPLICATION FILED MAR. 7, 1917.

1,309,583.

Patented July 8, 1919.
4 SHEETS—SHEET 1.

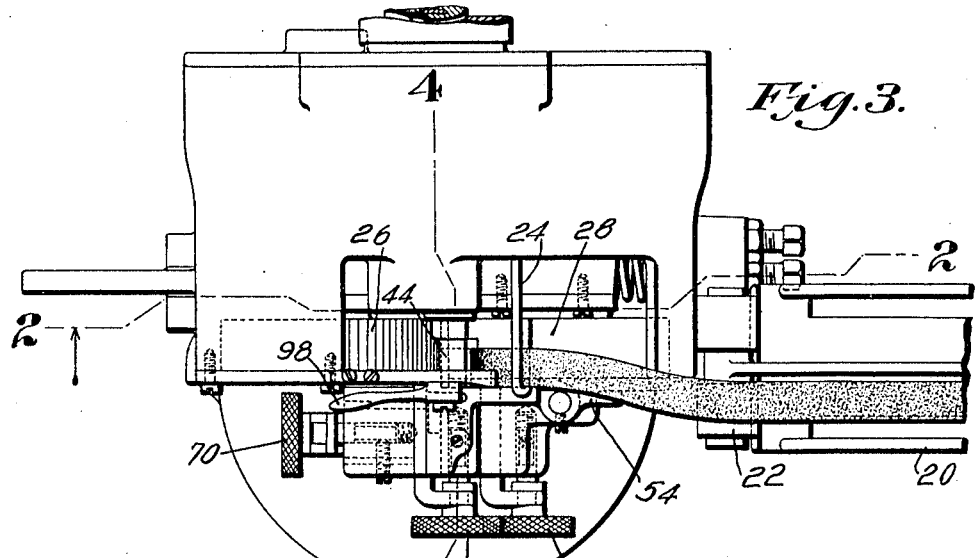
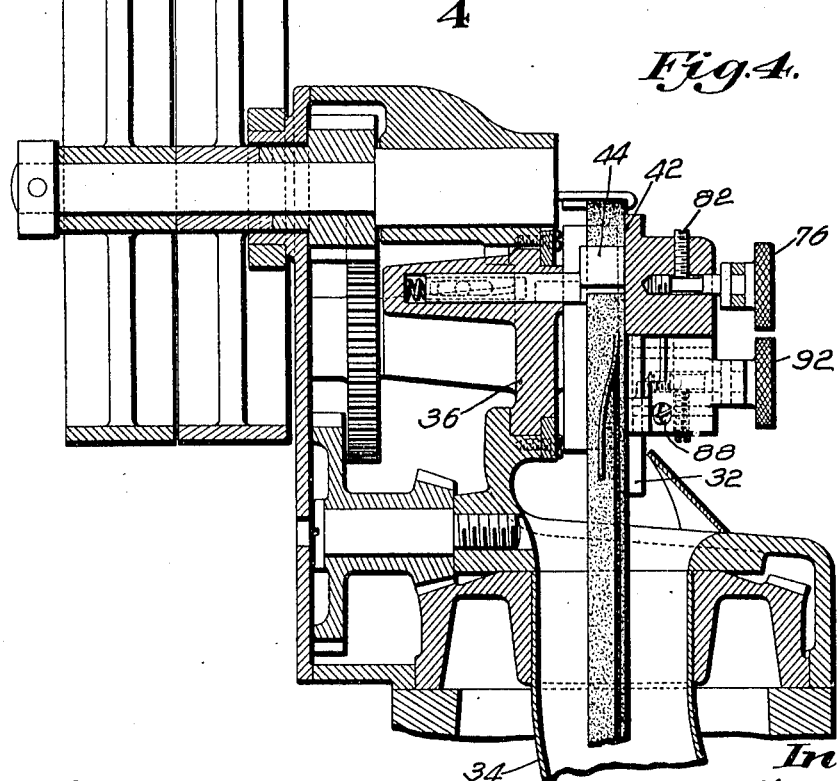

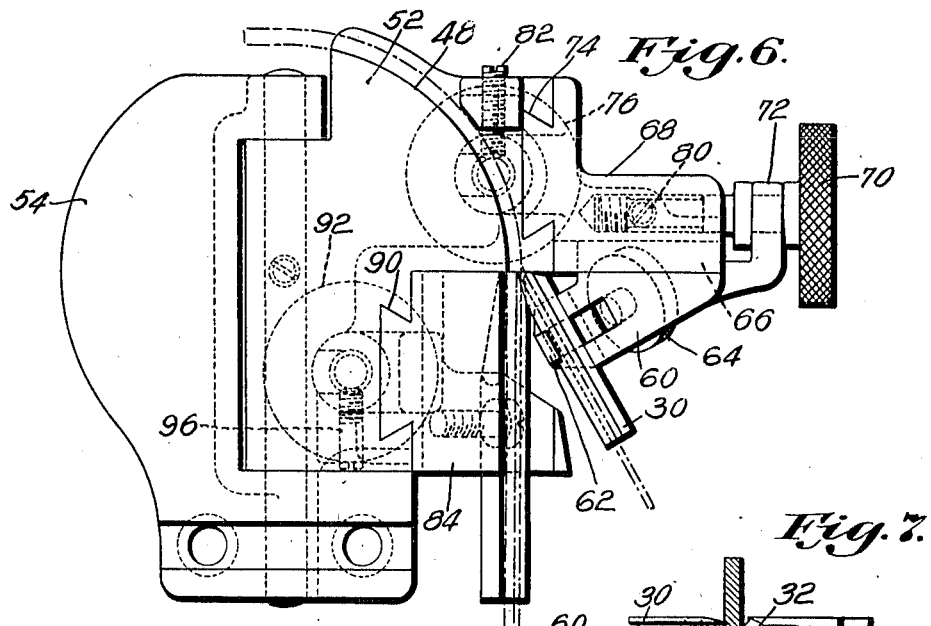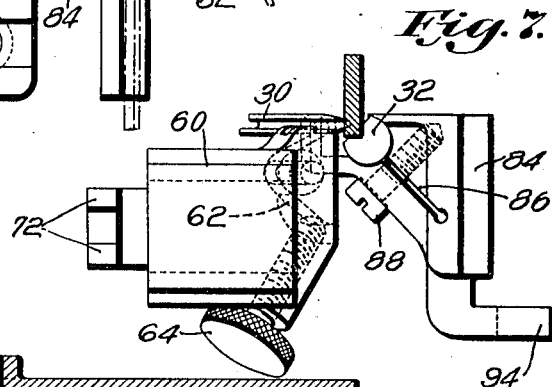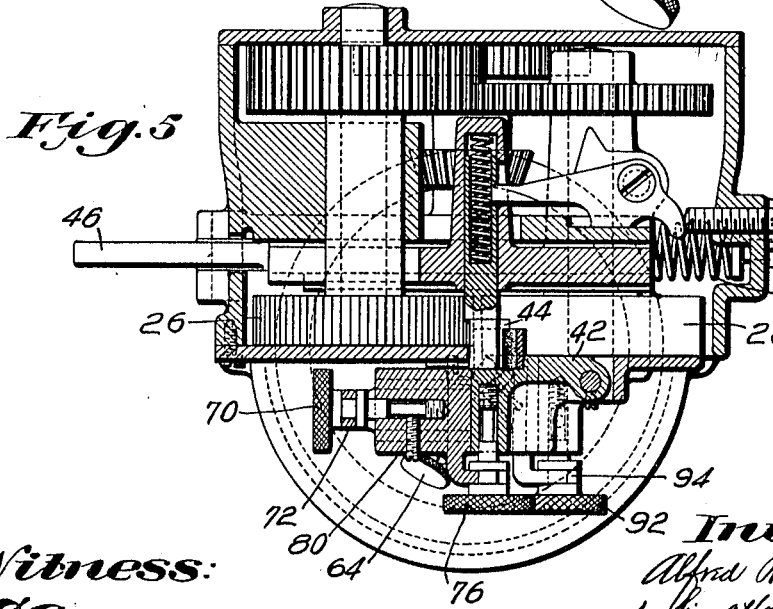

A. R. MORRILL.
MACHINE FOR PREPARING WELTING.
APPLICATION FILED MAR. 7, 1917.
1,309,583.
Patented July 8, 1919.
4 SHEETS—SHEET 4.
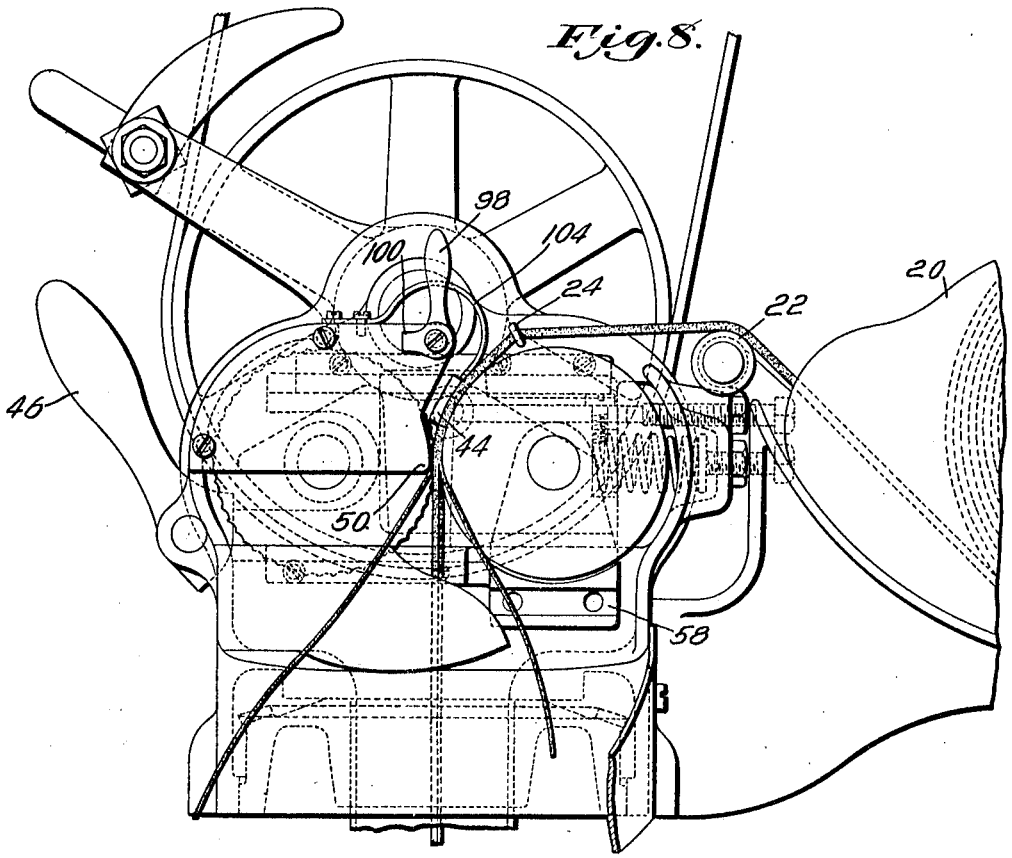
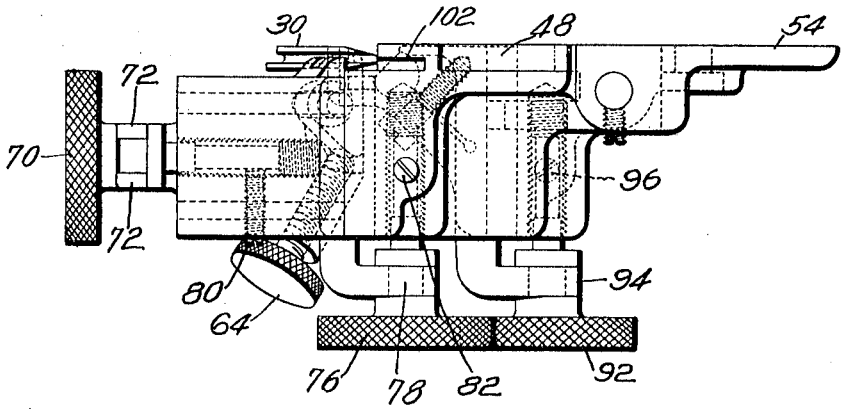
Witness:
E. C. Wurdeman
Inventor:
Alfred R. Morrill
by his attorneys
Van Everen, Fish & Hildreth

UNITED STATES PATENT OFFICE.

ALFRED R. MORRILL, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR PREPARING WELTING.

1,309,583.  Specification of Letters Patent.  Patented July 8, 1919.

Application filed March 7, 1917. Serial No. 153,014.

*To all whom it may concern:*

Be it known that I, ALFRED R. MORRILL, a citizen of the United States, residing at Beverly, in the county of Essex and State of Massachusetts, have invented certain new and useful Improvements in Machines for Preparing Welting; and I do hereby declare the following to be a full, clear, and exact description of the invention, such as will enable others skilled in the art to which it appertains to make and use the same.

The present invention relates to welt grooving and beveling machines and more particularly to machines of this type employed in connection with the preparation of welting for use in the manufacture of Goodyear welt shoes.

Machines of this type form a groove in the flesh side of the strip of welting for the reception of the inseam stitches and it is an important desideratum of such machines that the portion of the welting between the bottom of the groove and the face of the grain side through which the stitches pass shall be of uniform thickness independently of variations in the thickness of the welting strip.

Accordingly one object of the present invention is to provide a welt grooving and beveling machine having an improved construction and mode of operation, and by which that portion of the welting lying between the bottom of the groove and the grain side through which the stitches pass can be maintained at a substantially uniform thickness.

Another object of the invention is to mount the knives of a welt grooving and beveling machine in such a manner that they may be quickly moved into and out of operative position to permit inspection of the welt at the point of operation and allow the knives to be sharpened and adjusted without dismantling the machine.

With these and other objects in view the various features of the invention consist in certain novel features of construction, combinations and arrangements of parts hereinafter described and claimed, the advantages of which will be obvious to those skilled in the art from the following description.

Figure 1:
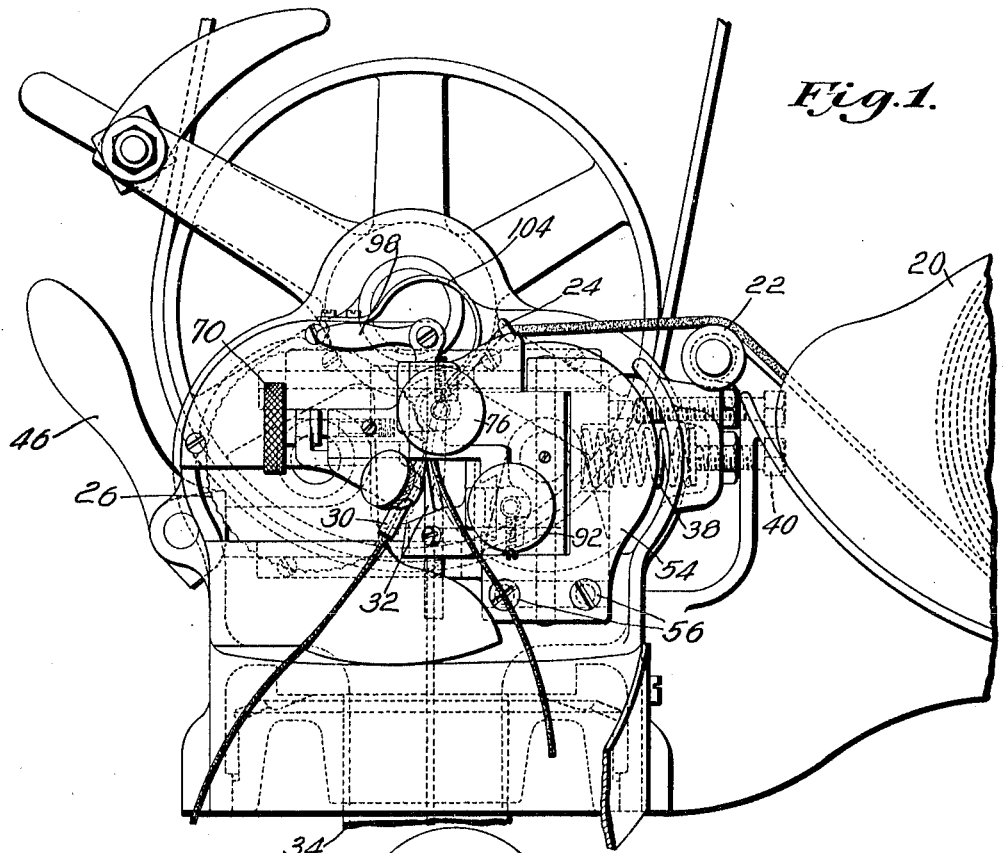
Figure 2:
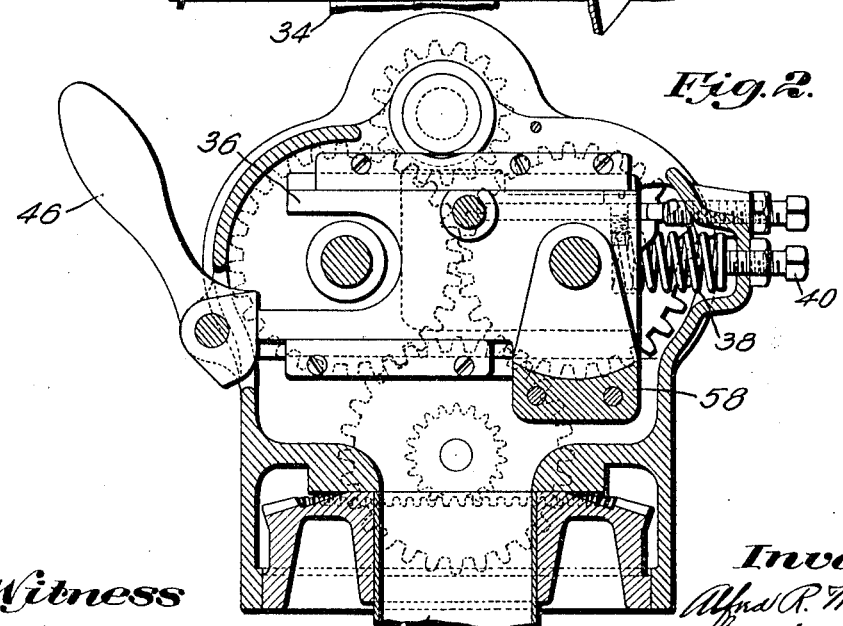

In the accompanying drawings illustrating the preferred form of the invention, Figure 1 is a view in front elevation of the head of a welt grooving and beveling machine embodying the preferred form of the invention; Fig. 2 is a vertical sectional view of the head of the machine taken on the line 2—2 of Fig. 3; Fig. 3 is a plan view of the head of the machine, the driving pulleys being broken away; Fig. 4 is a vertical section of the head of the machine taken on the line 4—4 of Fig. 3; Fig. 5 is a sectional plan view of the head of the machine; Fig. 6 is a detail view in side elevation of the welt grooving and beveling knives and the pivoted knife block in which they are mounted; Fig. 7 is a detail plan view of the grooving and beveling knives and the slides in which they are mounted; Fig. 8 is a view in front elevation of the machine head with the knife block and knives removed; and Fig. 9 is a plan view of the parts shown in Fig. 6.

The welt grooving and beveling machine illustrated in the drawings has substantially the same general construction and mode of operation as the machine shown and described in the patent to Morrill No. 1,204,897, dated November 14, 1916. In this machine welting in the form of a tightly wound coil is placed in a holder 20 (Figs. 1, 2, and 8) and led out over a guide roll 22 through a guide 24 and between a feed roll 26 and a coöperating work supporting roll 28. As the welting reaches the bite of the feed and supporting rolls it is acted upon by a grooving knife 30 and a beveling knife 32 and passes down through a revolving coiling tube 34 by which it is formed into a coil at the base of the machine frame. The feed roll 26 is mounted in fixed bearings in the machine frame and the supporting roll 28 is mounted in bearings in a carrier 36 which is slidably mounted in the machine frame. A coil spring 38 is mounted between an adjusting screw 40 in the machine frame and the carrier 36 to yieldingly press the supporting roll toward the feed roll to clamp the welt between them. While the welting is being grooved and beveled it is held against an inner edge guide 42 by means of a spring pressed outer edge guide 44 which is slidably mounted in the carrier 36. To open up the machine to permit welting to be easily threaded therethrough, the carrier 36 may be shifted by a hand lever 46 to move the supporting roll away from the feed roll and at the same time withdraw the outer edge guide from the inner edge guide. The parts above described have the same construction and mode of operation as the parts shown and described in the patent above referred to, and reference is hereby made to said patent for a detailed description of these parts.

In the machine illustrated in the drawings, the welting is positioned, as it passes between the feed and supporting rolls, so that one edge projects beyond the forward ends of the rolls. This projecting edge of the welt is supported on one side by a work support 48 (Figs. 5 and 6), and upon the other side by a fixed presser foot 50 (Fig. 8). The work support is arranged to be maintained in a fixed position with relation to the yieldingly mounted supporting roll, and its surface is concentric with and forms a continuation of the surface of the supporting roll. The work support is formed on the rear face of a knife block 52 (Fig. 6), which is pivotally mounted on a plate 54 secured by means of screws 56 (Fig. 1) to a forwardly projecting bracket 58 (Fig. 8) formed on the supporting roll carrier 36. The presser foot 50 is fixed to the machine frame immediately in front of the feed roll, and the surface of the foot bearing upon the welting is substantially concentric with a surface extending through the base of the teeth on the feed roll.

In order that the stock left between the bottom of the groove and the face of the grain side may be of uniform thickness, regardless of variations in thickness of the welting, the grooving knife 30 is secured to the supporting roll carrier 36 in a fixed position with relation to the surface of the supporting roll and work support. The mounting of the grooving knife is best shown in Figs. 1 and 6. As indicated, the grooving knife is located in front of the feed roll in position to operate upon the portion of the welting extending beyond the end of the roll. The presser foot 50, immediately above the grooving knife, terminates substantially in the line of bite of the rolls, and allows the cutting edge of the knife to be brought into the line of the bite of the rolls. The grooving knife, Figs. 6, 7, and 9, is held in a knife slide 60 by means of a pivoted clamp 62 which is actuated by a clamping screw 64. The clamp 62 permits the grooving knife to be adjusted in the direction of its length to bring its cutting edge into the line of the bite of the rolls. To enable the knife to be adjusted normally to the face of the welt, to vary the depth of the groove, the slide 60 is slidably mounted in a dove-tailed groove 66 formed in an intermediate slide 68. To adjust the slide 60, a thumb screw 70 is threaded into the intermediate slide 68 and has an annular groove arranged to receive a pair of upstanding ears 72 formed on the knife slide 60. To permit the knife to be adjusted in a direction transverse to the surface of the welt, to vary the distance of the groove from the edge of the welt, the intermediate slide 68 is slidably mounted in a dovetailed slot 74 formed in the knife block 52. The slide 68 is adjusted by means of a thumb screw 76, which is threaded into the knife block 52 and has an annular groove arranged to receive a pair of upstanding ears 78 projecting from the intermediate slide 68. In order to maintain the adjustments of the grooving knife, the thumb screws 70 and 76 are clamped in adjusted position by means of set-screws 80 and 82. The set-screws 80 and 82 are threaded through the intermediate slide 68 and knife block 52 respectively, and bear against a cylindrical section of the threaded portion of the screws. With the construction outlined above, the adjustments of the grooving knife are made with relation to the surface of the supporting roll, and the position of the grooving knife with relation to the surface is maintained throughout the operation of the machine. Any variations in the thickness of the welt will vary the depth of the groove, but the stock between the bottom of the groove and the grain side of the welt will have a uniform thickness.

To produce a uniform bevel upon the welt, regardless of any variations in thickness, the beveling knife 32 is mounted with its cutting edge in a fixed position with relation to the supporting surface of the supporting roll and the surface of the work support 48. The beveling knife, as best shown in Figs. 1, 6 and 7, is mounted below the work support in position to operate upon the portion of the welt extending beyond the front end of the supporting roll. The work support 48 terminates substantially in the line of the bite of the rolls, which permits the cutting edge of the beveling knife to be located in the line of the bite of the rolls. The knife is secured in a knife slide 84 by means of a split clamp 86 and a clamping screw 88. The knife has a cylindrical form and the construction of the clamp permits an adjustment of the knife in the direction of its length, to bring its cutting edge into the desired position with relation to the work support 48, and an angular adjustment of the knife to vary the angle of the bevel. To permit the beveling knife to be adjusted transversely of the line of feed to vary the width of bevel, the knife slide 84 is slidably mounted in a dovetailed slot 90 (Fig. 6), formed in the knife block 52. The adjustment of the slide 84 is obtained by means of a thumb screw 92 which is threaded into the knife block 52, and has an annular groove to receive a pair of upstanding lugs 94 projecting from the slide 84. To hold the knife slide 84 in adjusted position, a set-screw 96 is threaded through the knife block 52 and bears upon a cylindrical section formed in the threaded portion of the thumb screw 92. With this construction the movement of the supporting roll, due to variations in thickness or irregularities in the welt strip, will correspondingly move the beveling knife to maintain a uniform bevel.

It will be noted that the knife block 52 and plate 54 cover the face of the supporting roll 28, and the adjusting slides of the grooving knife extend across the face of the feed roll. These parts when in operative position conceal the point at which the knives operate upon the welt. The pivot of the knife block is vertical and normal to the axis of the supporting roll, and offset from the point of operation of the knives on the welt to such an extent that when the block is swung outwardly on its pivot, the point at which the knives operate on the welt will be exposed. At the same time the grooving and beveling knives will be brought to a position where they can be readily inspected and adjusted or removed for sharpening. The knife block is locked in operative position by means of a manually operable latch 98. The latch 98 is pivoted to the upper portion of the presser-foot 50 and has a tooth 100 which is arranged to fit into a slot 102 (Figs. 6 and 9) formed on the upper edge of the knife block. The slot 102 is elongated to permit the yielding movement of the knife block relatively to the latch while operating on the welting.

To assist in positioning the welting upon the supporting roll 28, a leaf spring 104 (Figs. 1, 3, and 8) is secured to the upper edge of the presser-foot 50, and its forward end bears against the welting. This spring holds the welting flat upon the supporting roll and places sufficient friction on the welting to keep it smooth as it enters the bite of the rolls.

While the features described above are well adapted for use in the type of machine illustrated in the drawings, it is to be understood that except as defined in the claims certain features of the invention are not limited to use in a machine embodying any or all of the other features.

The preferred from of the invention having been thus described, what is claimed as new is:

1. A machine for preparing welting, having in combination, a feed roll to act on the flesh side of a welting strip mounted in fixed bearings, a coöperating work supporting roll, a carrier for the work supporting roll movable toward and from the feed roll and a grooving knife to act on the flesh side of the welting strip mounted on said carrier.

2. A machine for preparing welting, having in combination, a feed roll to act on the flesh side of a welting strip mounted in fixed bearings, a coöperating work supporting roll, a carrier for the work supporting roll movable toward and from the feed roll, a grooving knife to act on the flesh side of the welting strip mounted on said carrier, and a beveling knife to act on the grain side of the welting strip also mounted on said carrier.

3. A machine for preparing welting, having in combination, a feed roll to act on the flesh side of a welting strip mounted in fixed bearings, a coöperating work supporting roll, means for guiding a welting strip with one edge projecting beyond the end of the feed roll, a fixed presser foot on the same side of the welting strip as the feed roll arranged to bear on the projecting edge of the strip, a carrier for the work supporting roll movable toward and from the feed roll, and a grooving knife to act on the flesh side of the welting strip mounted on the carrier.

4. A machine for preparing welting, having in combination, a feed roll to act on the flesh side of a welting strip mounted in fixed bearings, a coöperating work supporting roll, a carrier for the work supporting roll movable toward and from the feed roll, means for guiding the welting strip with one edge projecting beyond the end of the feed roll, a presser foot to engage the flesh side of the projecting edge of the welting, terminating at the bite of said rolls, and a grooving knife mounted on said carrier with its cutting edge substantially in the line of the bite of said rolls.

5. A machine for preparing welting, having in combination, coöperating supporting and feeding rolls, means for guiding a welting strip with one edge projecting beyond the end of the feeding roll, a fixed presser-foot terminating in the line of the bite of the rolls for engaging the projecting edge of the welting, a knife block mounted on a pivot lying in a plane substantially normal to the axes of the rolls, and a knife for operating on the projecting edge of the welting mounted in said block and extending under said presser-foot with its cutting edge in the line of the bite of the rolls.

6. A machine for preparing welting, having in combination, coöperating feeding and supporting rolls, a carrier for the supporting roll movable toward and from the feeding roll, means for guiding a welting strip with one edge projecting beyond the end of the feeding roll, a fixed presser-foot terminating in the line of the bite of the rolls for engaging the projecting edge of the welting, a knife block mounted in said carrier on a pivot lying in a plane substantially normal to the axes of the rolls, and a knife for acting on the projecting edge of the welting mounted in said block and extending under the presser-foot with its cutting edge in the line of the bite of the rolls.

7. A machine for preparing welting, having in combination, coöperating supporting and feeding rolls, a knife for operating upon a strip of welting at the bite of the rolls, a knife block for said knife mounted on a pivot lying in a plane substantially normal to the axes of the rolls, said pivot being offset from the point of operation of the knife upon the welt, and means for holding said block in operative position.

8. A machine for preparing welting, having in combination, coöperating feeding and supporting rolls, a carrier for the supporting roll movable toward and from the feeding roll, means for guiding a welting strip with one edge projecting beyond the ends of the rolls, a work support for supporting the grain side of the projecting edge of the welting, a fixed presser-foot for supporting the flesh side of the projecting edge of the welting, said work support and presser-foot terminating substantially in the line of the bite of the rolls, a grooving knife and a beveling knife for operating upon the projecting edge of the welting mounted beneath the presser-foot and work support respectively with their cutting edges at the bite of the rolls, a knife block for supporting said knives mounted on a pivot lying in a plane substantially normal to the axes of the rolls, and means for holding the knife block in operative position.

9. A machine for preparing welting, having, in combination, a feed roll to act on the flesh side of a welting strip mounted in fixed bearings, a coöperating work supporting roll, a carrier for the work supporting roll movable toward and from the feed roll, and a grooving knife to act on the flesh side of the welting strip connected to the carrier so as to be moved thereby.

10. A machine for preparing welting, having, in combination, a feed roll, a coöperating work supporting roll, means for guiding a welt strip with one edge projecting beyond the ends of the rolls, a work support for the projecting edge of the welting having a welt supporting surface concentric with the surface of the work supporting roll, a beveling knife, a knife block carrying said support and beveling knife mounted on a pivot lying in a plane substantially normal to the axes of the rolls, and means for holding said block in operative position.

ALFRED R. MORRILL.

Copies of this patent may be obtained for five cents each, by addressing the "Commissioner of Patents, Washington, D. C."